Patented Dec. 28, 1926.

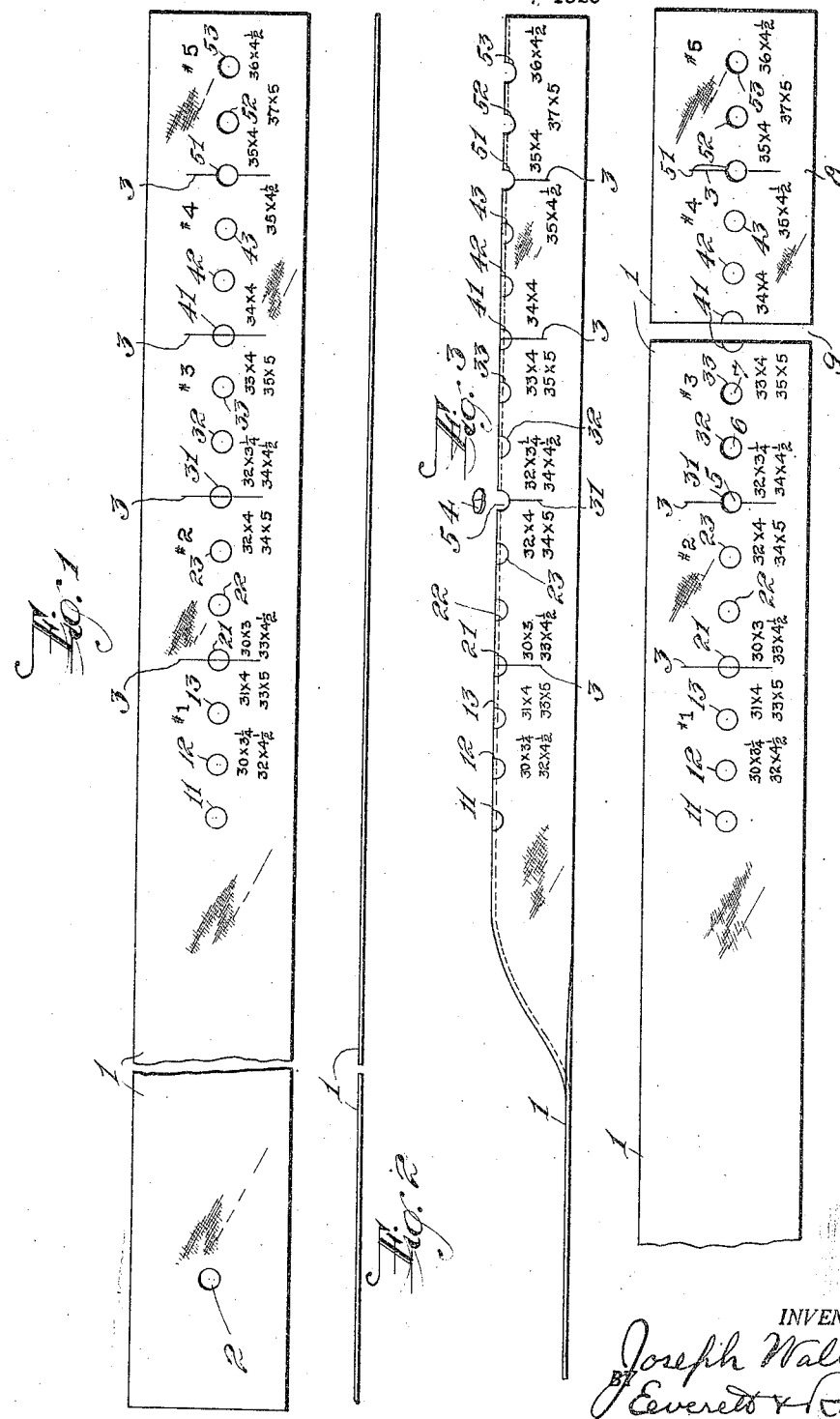

1,612,788

UNITED STATES PATENT OFFICE.

JOSEPH WALTEN, OF RAHWAY, NEW JERSEY, ASSIGNOR TO WILLIAM McCOLLUM, OF RAHWAY, NEW JERSEY.

TIRE FLAP.

Application filed January 22, 1925. Serial No. 3,941.

The objects of this invention are to eliminate the practice of manufacturing and selling tire flaps in various different lengths or sizes, and to provide a flap which can be used for all sizes; to provide at the adjustable end of the flap indicia for enabling the user to alter it to all smaller sizes; to provide a tire flap already apertured for the largest size and having indicia for the user to properly aperture it for smaller sizes; to enable any surplus end portion of the tire flap to be cut off at the right point after the flap has been apertured; to thus avoid undue overlapping of the ends of the tire flap; to thus provide a tire flap which can be quickly and accurately altered for any given size of tire and yet shall at all times provide a complete closure without overlapping portions, and to obtain other advantages and results as may be brought out by the following description.

Referring to the accompanying drawing, in which the same numerals of reference designate corresponding and like parts through-out the several views, Figure 1 is a view of the outer side of a flap of my improved construction extended and with a portion intermediate its ends broken away.

Figure 2 is an edge view of the same;

Figure 3 is an edge view of the adjustable end of the improved tire flap pinched or folded along a longitudinal median line for aperturing, and Figure 4 is an outer side view of said adjustable end after it has been apertured for use as a No. 3 flap and its surplus end portion cut off.

In the specific embodiment of the invention shown in said drawings, 1 indicates a tire flap of any suitable material or composition such as is commonly placed between the inner tube and adjacent edges of the shoe or casing to cover the opening through which the inner tube has been inserted, as is common in pneumatic tires. Said tire flap is provided at one end with an aperture 2 to receive the valve stem of the inner tube upon starting to insert the tire, and it will be understood that it is desired to have the opposite end of the tire flap apertured to similarly receive the valve stem when the tire flap has been put in place extending clear around the inner circumference of the tube and tire. This distance varies for different sizes of tires, and it is common in the art to sell tire flaps in five different lengths known as No. 1 to No. 5, each being for certain designated sizes of tires and each having in its adjustable end three holes any one of which may receive the valve stem when the tire flap is in place. It will be further understood that it is not possible to cut the entire series of fifteen holes in the longest or No. 5 tire flap, because for the larger sizes of tires a portion of the holes would be exposed and the tire flap would not effect the closure for which it is intended; also if the opposite end of the flap were extended so as to overlie said exposed apertures it would produce a long free end which if it stays in place causes an objectionable overlapping or double thickness of the flap for a considerable distance and if it slips laterally out of place causes an unevenness which injures the inner tube. Again it will be understood that the aperturing of a tire flap must be done with considerable exactness and accuracy or otherwise a fullness or a tightness will be produced which is not apparent when the flap is being inserted but which will cause serious damage after the tire is inflated.

In order to avoid all these difficulties and yet secure a tire flap which shall be alterable for all sizes of tires, I make my improved tire flap of the maximum length of tire flaps or of a length equal to that of a No. 5 tire flap and aperture its extreme end portion as at 51, 52, 53 as would be done in a No. 5 flap, which is the flap used for 35x4, 36x4½ and 37x5 tires. In series with said apertures 51, 52, 53 I stamp, print or otherwise mark upon the tire as at 41, 42, 43 the proper location for apertures for a No. 4 flap, as at 31, 32, 33 the proper location for apertures for a No. 3 flap as at 21, 22, 23 the proper location for apertures for a No. 2 flap, and as at 11, 12, 13 the proper location for apertures for a No. 1 flap. Adjacent each group of holes for a different length flap is preferably printed or otherwise displayed the tire sizes for which that group of holes is to be used and also the number of tire flap heretofore in use to which said group of holes corresponds. Thus if a purchaser knows that heretofore he has used a No. 3 flap, for example, he knows that he should aperture this flap at 31, 32 and 33 or some one of them, and if he did not know the number of flap which he had been using but knew that his tires were 33x4, for example, he would see from my improved tire flap that he should make holes at 31, 32 and 33 or one of them. Having made such holes, the user can just as well cut off the surplus end portion of the tire flap, and to indicate the proper point of severance cross-marks 3 are preferably shown upon my improved tire flap.

Of course if a purchaser of my improved flap needs a No. 5 flap or a flap for a 35x4, 36x4½ or 37x5 tire he will use the tire flap just as he purchases it. But if as already supposed he wants a No. 3 tire flap or one for a 33x4 tire, he will aperture my improved tire flap at 31, 32 and 33, which is readily done by pinching or folding that portion of the flap upon a longitudinal median line, as shown in Figure 3, and cutting out with a pocket knife or the like the portion or portions of it necessary to form the aperture or apertures, as shown in Figure 3, a cut-out portion being there designated by reference numeral 4 and the aperture by reference numeral 5. Figure 4 shows the tire flap flattened out again with all the apertures 5, 6 and 7 for a No. 3 flap formed and also with the surplus end portion 8 of the tire flap cut off as at 9. This surplus end portion 8 is discarded and the user has left a No. 3 flap which can be used the same way as No. 3 flaps which have been sold heretofore. The purchaser has had to do nothing to the flap which he bought except make the four cuts described, and at the same time it is as accurate and sure to fit properly as the No. 3 flap which has been heretofore sold as one of the series of five distinct flaps. Any one of my improved flaps is thus adapted to be used for any size tire, and in carrying stock it is unnecessary to carry the needed number of five different lengths of flaps and the stock needed to be carried is only one-fifth of what it has been with the series of flaps of different lengths.

Some variations of details may be made in carrying out my invention without departing from the spirit and scope thereof, and therefore I do not wish to be understood as limiting myself except as required by the following claims when construed in the light of the prior art.

Having thus described the invention, what I claim is:

1. A tire flap having at an imperforate portion of itself near one end indicia for aperturing said imperforate portion to make the flap any one of a plurality of sizes.

2. A tire flap apertured at one end portion of itself for a certain size and having upon its imperforate portion adjacent said apertured end portion indicia for aperturing said imperforate portion to make the flap a smaller size.

3. A tire flap apertured at one end portion of itself for a certain size and having upon its imperforate portion adjacent said apertured end portion indicia for aperturing said imperforate portion to make the flap any one of a plurality of smaller sizes.

4. A tire flap having at an imperforate portion of itself near one end indicia for aperturing said imperforate portion to make the flap any one of a plurality of sizes and for transversely cutting off so much of the end portion of the flap as will be superfluous upon such aperturing.

5. A tire flap apertured at one end portion of itself for a certain size and having upon its imperforate portion adjacent said apertured end portion indicia for aperturing said imperforate portion to make the flap a smaller size and for transversely removing so much of the end portion of the original flap as will be superfluous for said smaller size.

JOSEPH WALTEN.